United States Patent
Mangelsen et al.

(10) Patent No.: US 8,272,179 B2
(45) Date of Patent: Sep. 25, 2012

(54) WORK STATION SAFETY BARRIER (75) Inventors: Jan Christian Mangelsen, Charlotte, IA (US); Terry Daggett, Blue Grass, IA (US); Michael P. Skahill, Pleasant Valley, IA (US)

(73) Assignee: Genesis Systems Group, LLC, Davenport, IA (US)

( * ) Notice: Subject to any disclaimer, the term of this patent is extended or adjusted under 35 U.S.C. 154(b) by 1442 days.

(21) Appl. No.: 11/284,202

(22) Filed: Nov. 21, 2005

(65) Prior Publication Data

US 2007/0113991 A1  May 24, 2007

(51) Int. Cl.
*E04H 1/00* (2006.01)
*E04H 3/00* (2006.01)
*E04H 5/00* (2006.01)
*E04H 6/00* (2006.01)
*E04H 14/00* (2006.01)

(52) U.S. Cl. ............................................. 52/239; 52/70
(58) Field of Classification Search .................. 160/188, 160/197, 202, 222, 224; 52/239; 74/608, 74/612, 613; 49/73.1, 100, 102
See application file for complete search history.

(56) References Cited

U.S. PATENT DOCUMENTS

| | | | |
|---|---|---|---|
| 1,439,373 A * | 12/1922 | Maier et. al. ..................... | 49/102 |
| 2,872,183 A | 2/1959 | Harty | |
| 3,352,059 A | 11/1967 | Metz | |
| 3,871,437 A * | 3/1975 | Jones ............................ | 160/202 |
| 5,299,386 A | 4/1994 | Naegelli et al. | |
| 5,806,245 A | 9/1998 | Satrom | |
| 6,145,571 A | 11/2000 | Snyder | |
| 6,311,757 B1 * | 11/2001 | Schuette et al. .............. | 160/202 |
| 6,325,195 B1 | 12/2001 | Doherty | |
| 6,688,374 B2 * | 2/2004 | Dondlinger ................... | 160/340 |
| 6,708,956 B1 | 3/2004 | Mangelsen et al. | |

OTHER PUBLICATIONS

Frommelt Safety Products; "Verti-Guard Versatile Safety Guard Machine Guarding Products", Sales brochure, © 2001. www.frommeltsafety.com; 2 pages.*
Frommelt® Safety Products; "Verti-Guard™ Versatile Safety Guard Machine Guarding Products" Sales Brochure, 2001.
Almega E. Series Arc Cells (http://www.daihen-usa.com/celle.htm) Mar. 16, 2004.
Motoman, a Yaskawa company, "ARCWORLD II-200", Solutions in Motion® Dec. 2003.
Motoman, a Yaskawa company, News Release Apr. 30, 2004, Motoman's New ArcWorld V-6300 (Ferris Wheel), http://motoman.com/news/pr.asp?ID=13.

* cited by examiner

*Primary Examiner* — Katherine W Mitchell
*Assistant Examiner* — Jeremy Ramsey
(74) *Attorney, Agent, or Firm* — McKee, Voorhees & Sease, P.L.C.

(57) ABSTRACT

A barrier for a robotic work station is provided and includes a pair of upright posts, and rigid panels which are movable between a lower open position and a raised closed position. The panels are simultaneously moved between the raised and lower positions by a pneumatic cylinder and a pulley system. The movable panels are cantilevered from one of the posts, and include rollers for movement within a channel in the post. A fixed panel is provided at the bottom of the posts and extends approximately to the top of the work station table.

20 Claims, 12 Drawing Sheets

WORK STATION SAFETY BARRIER

BACKGROUND OF THE INVENTION

Robotic work stations often have a safety barrier adjacent the work station to protect workers from injury during operation of the robotic equipment. Prior art barriers include a pair of spaced apart posts adjacent the work station, between which are mounted panels or curtains which provide a wall between the worker and the work station. Some prior art barriers include a top cross bar from which a curtain drops down to form the barrier wall, or which supports a mechanism to pull a curtain up to form the wall. Such an upper cross bar is undesirable, in that it precludes the use of an overhead crane for removing work pieces into the work station between the barrier posts. Another disadvantage of a curtain type barrier is that the curtain moves slowly and typically has to move the entire distance between the floor and the upper ends of the posts, thus increasing the travel distance for the curtain. Also, a drop-down type barrier wall presents a hazard in situations where the worker is at the work station and the curtain or panels accidentally drop down onto the head or back of the worker, thus pushing the worker forwardly into the work station. Other types of prior art barriers include a large panel which can be raised to block the work station during a work process. A disadvantage of such a panel barrier is the high profile of the panel, even in the lowered position.

Therefore, a primary objective of the present invention is the provision of an improved work station barrier.

Another objective of the present invention is the provision of a work station barrier which moves upwardly from an open position to a closed position.

Another objective of the present invention is the provision of a barrier for a robotic work station which is open at the top so as to accommodate an overhead hoist or crane for moving work pieces between the barrier posts.

A further objective of the present invention is the provision of a work station barrier which will urge a work away from the work station in the event of accidental actuation of the barrier wall.

Still another objective of the present invention is the provision of a barrier for a robotic work station which minimizes the travel distance and time for the barrier panels.

Yet another objective of the present invention is the provision of a work station barrier having multiple rigid panels which move between a lower open position and a raised closed position.

A further objective of the present invention is the provision of a work station barrier having multiple panels which move simultaneously between open and closed positions.

Still another object of the present invention is the provision of a work station barrier having multiple panels which can be lowered to provide a low profile.

Another objective of the present invention is the provision of a work station barrier which is economical to manufacture, durable in use, and safe in operation.

These and other objectives will become apparent from the following description of the invention.

BRIEF SUMMARY OF THE INVENTION

A work station barrier comprises a pair of spaced apart upright posts, with a lower fixed panel extending between the posts. The fixed panel has a height corresponding to the height of the work station table or bench. First and second movable panels extend between the posts for movement between a lowered open position and a raised closed position. In the lower, opened position, the fixed panel and movable panels are stacked one behind another at the bottom of the posts. A pneumatic cylinder is connected to the middle panel for raising and lowering the middle panel. A chain and sprocket or pulley assembly is connected between the first and second panels so that as the cylinder moves the first panel, a second panel is automatically and simultaneously raised and lowered by the pulley assembly. The pulley assembly allows the second panel to move to its fully raised and lowered positions in the same amount of time as the first panel takes to move between its fully raised and lowered positions. The first and second movable panels are cantilevered from one of the posts, and include rollers for movement along the post. The opposite post has a track to receive the opposite ends of the first and second panels so as to guide the movement of the panels between the lowered and raised positions.

DETAILED DESCRIPTION OF THE PREFERRED EMBODIMENT

The work station barrier of the present invention is generally designated by the reference numeral 10 in the drawings. The barrier 10 is intended for use adjacent a work station, such as a robotic station wherein a work piece is positioned on a table or bench for treatment of the piece by a robotic arm. The barrier 10 includes upright posts 12, 14. The posts 12, 14 are hollow and include slots 16, 18 extended from top to bottom on the inwardly directed faces of the posts. The space or area between the upper ends of the posts 12, 14 is open, without any interconnecting structure, whereby solid work pieces may be carried or moved between or through the posts 12, 14 to the work table or bench by an overhead crane or hoist. The posts 12, 14 may be connected to additional walls extending around the work station using connecting pins 20 which are removably inserted through tabs 22 on the outer lateral sides of the posts 12, 14.

A rigid lower panel 24 is fixed between the posts 12, 14 adjacent the floor. The lower panel 24 has a height corresponding to the work station table or bench. The panel 24 is stationary and does not move.

A middle panel 26 and an upper panel 28 extend between the posts 12, 14 and are movable between a lowered, open position and a raised, closed position. Each panel 26, 28 includes opposite sides which extend through the slots 16, 18 in the posts 12, 14, such that the slots 16, 18 define tracks for guiding the movement of the panels 26, 28 between the upper and lower positions.

Figure 7:
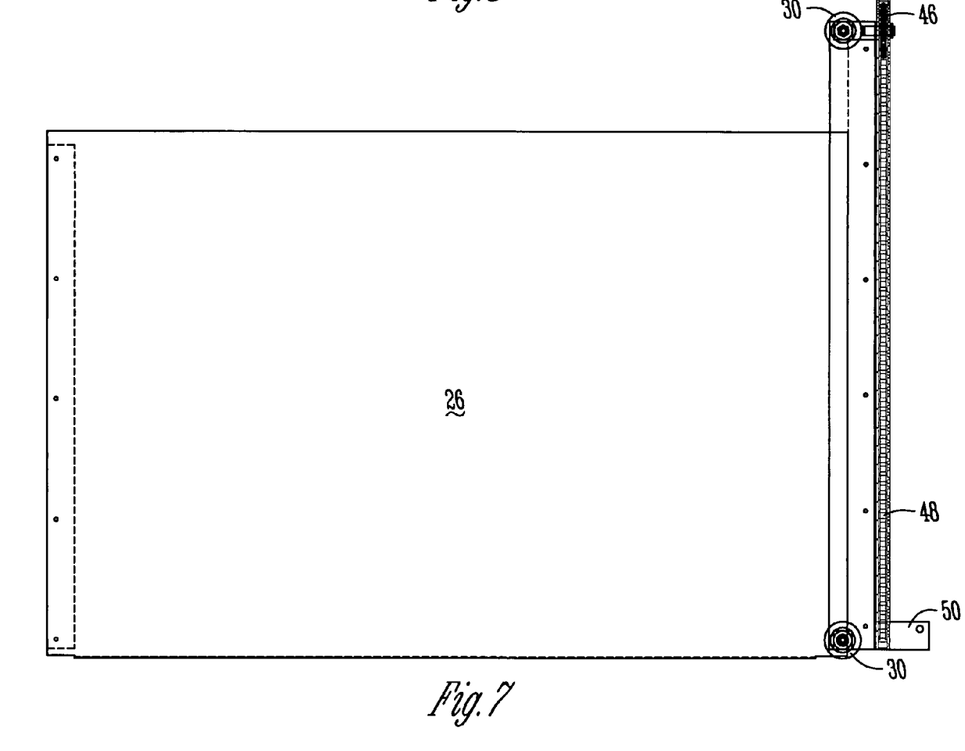
FIG. 7 is a front elevation view of the middle panel.
Figure 8:
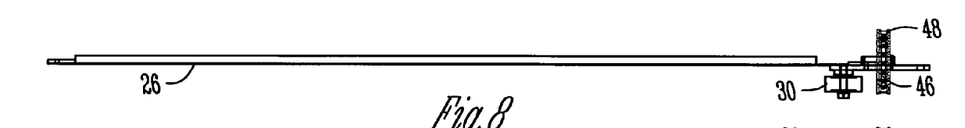
FIG. 8 is a top plan view of the middle panel.
Figure 9:
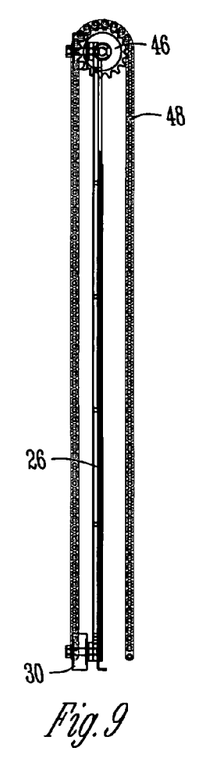
FIG. 9 is a side elevation view of the middle panel.
Figures 10, 11, 12:
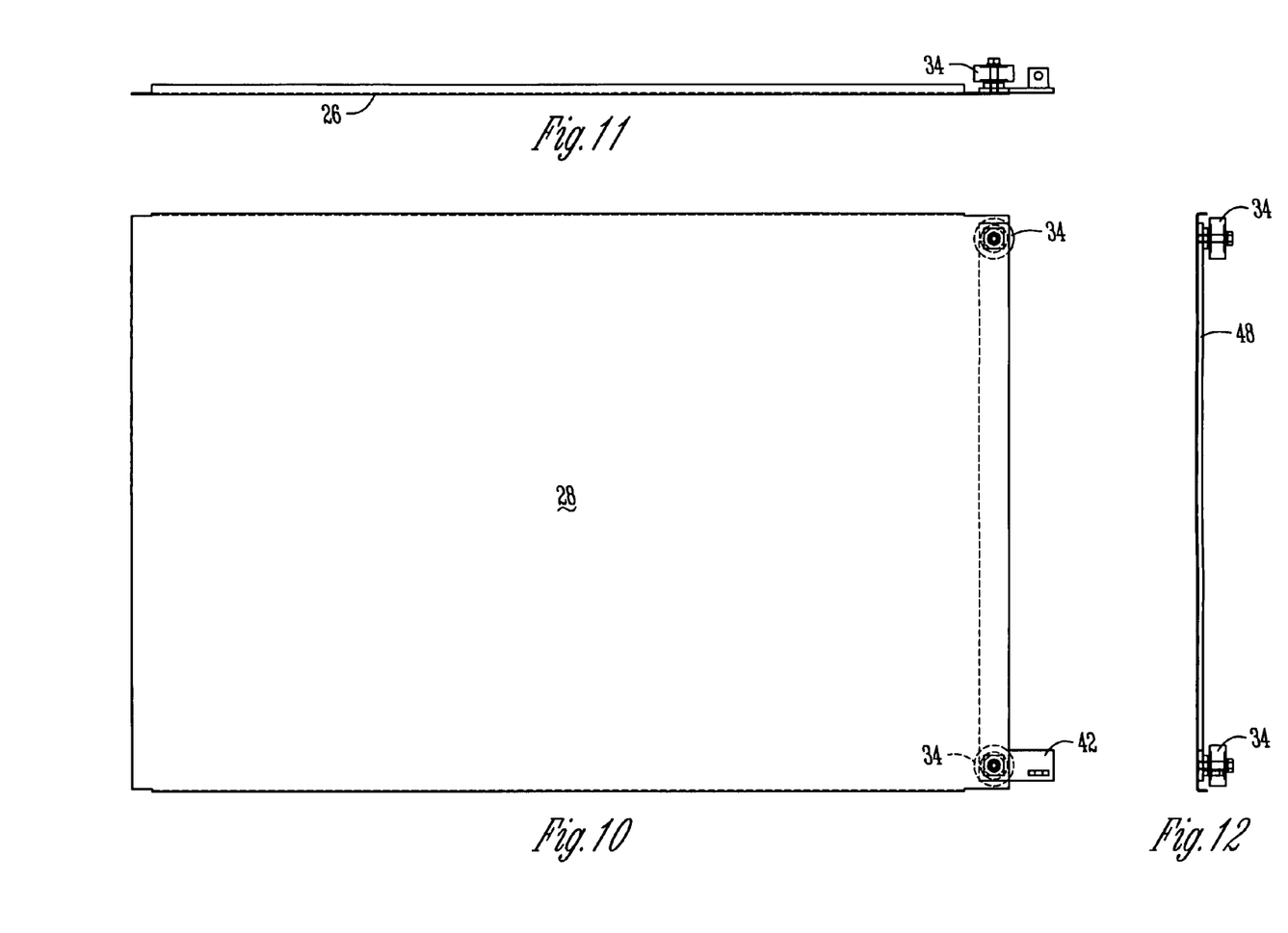
FIG. 10 is a front elevation view of the upper panel.
FIG. 11 is a top plan view of the upper panel.
FIG. 12 is an end elevation view of the upper panel.
Figure 13:
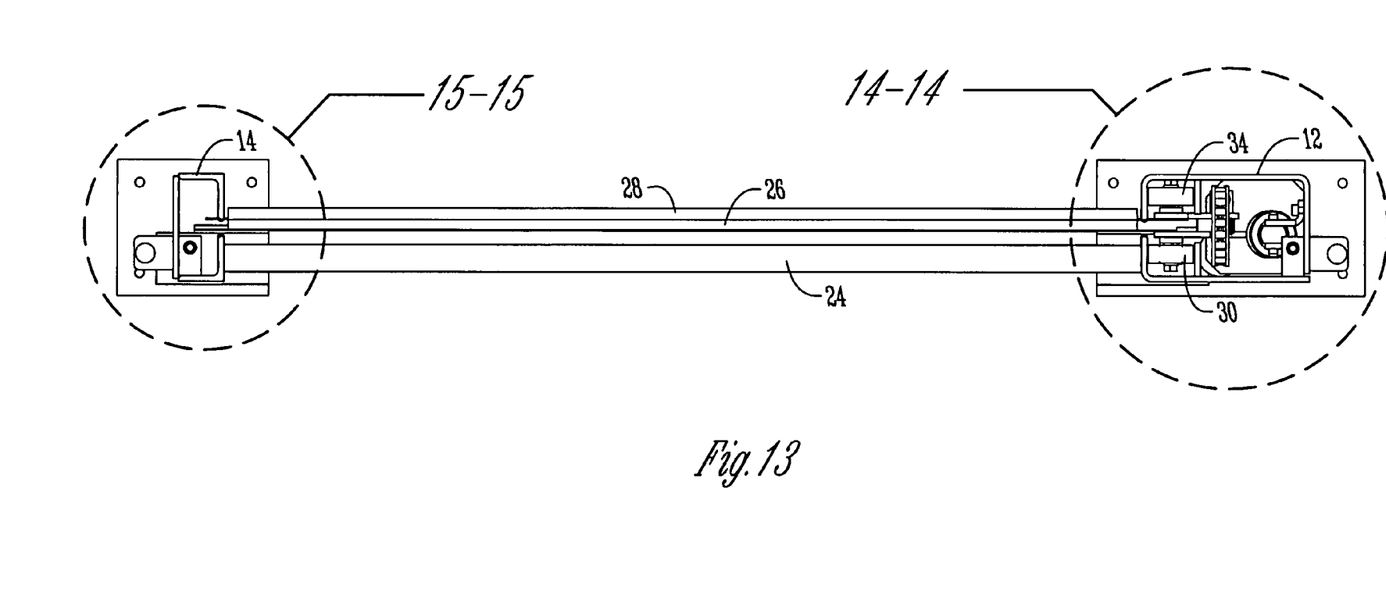
FIG. 13 is a top plan view of the barrier wall, with the upper caps of the posts removed.

More particularly, each panel 26, 28 is cantilevered from the post 12. As seen in FIGS. 7-9, the middle panel 26 includes a pair of upper and lower rollers 30 adjacent one lateral edge, with the rollers 30 being received in a channel 32 of the hollow post 12. Similarly, the upper panel 28 includes rollers 34 adjacent one lateral edge for receipt in the channel 32 of the post 12, as seen in FIGS. 10-12.

Figure 1:
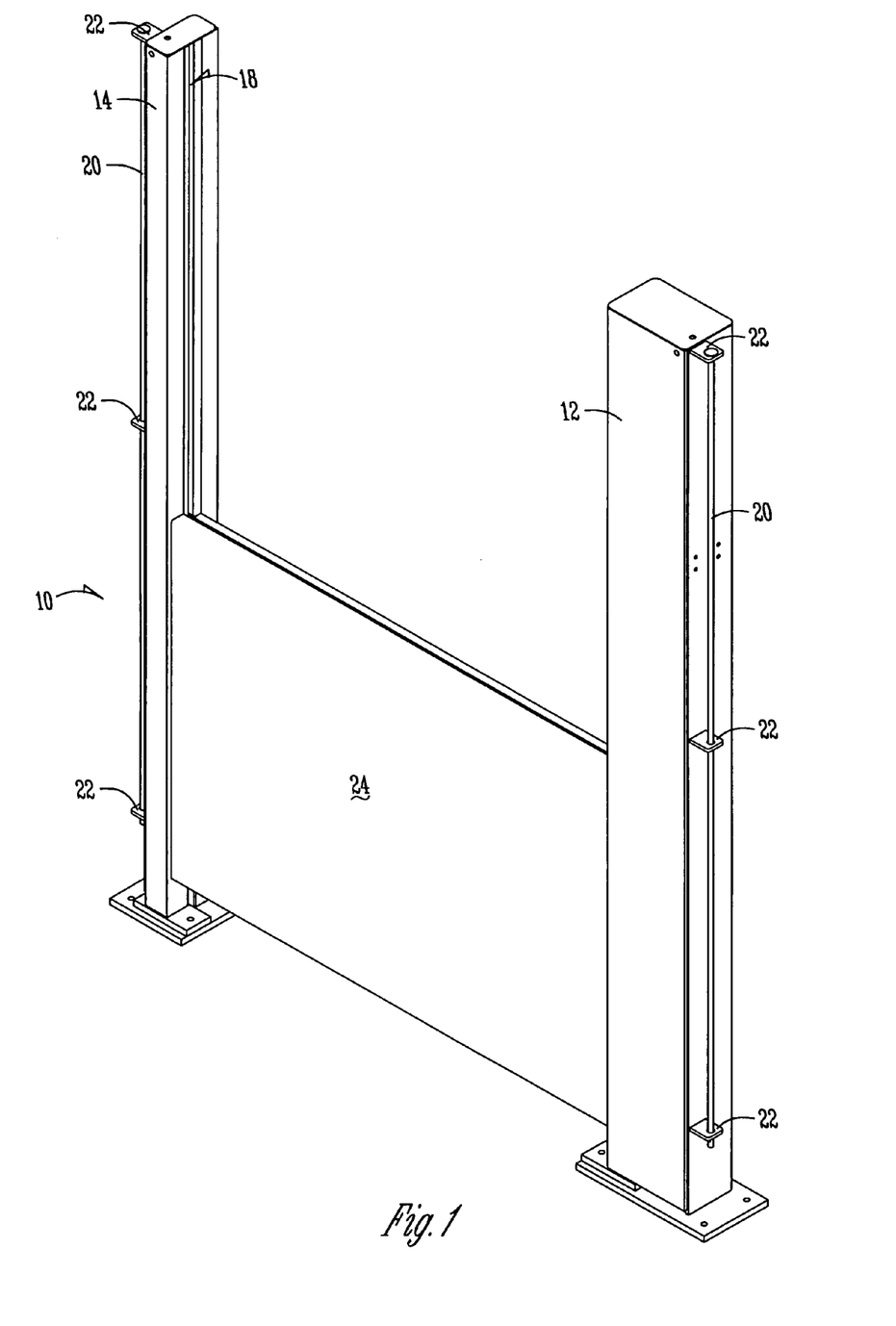
FIG. 1 is a perspective view of the barrier of the present invention with the panels in a lowered open position.
Figure 2:
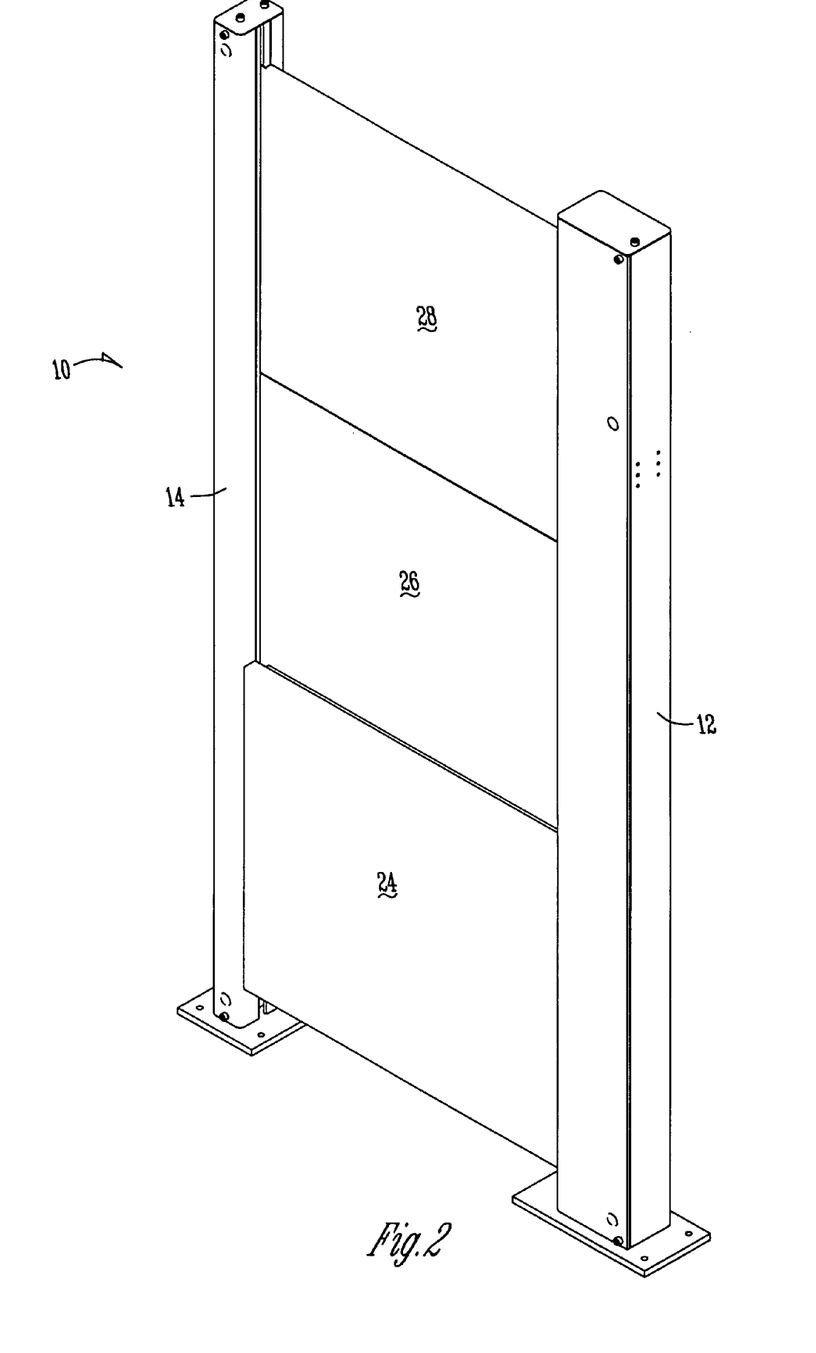
FIG. 2 is a perspective view of the barrier with the panels in a raised closed position.
Figure 3:
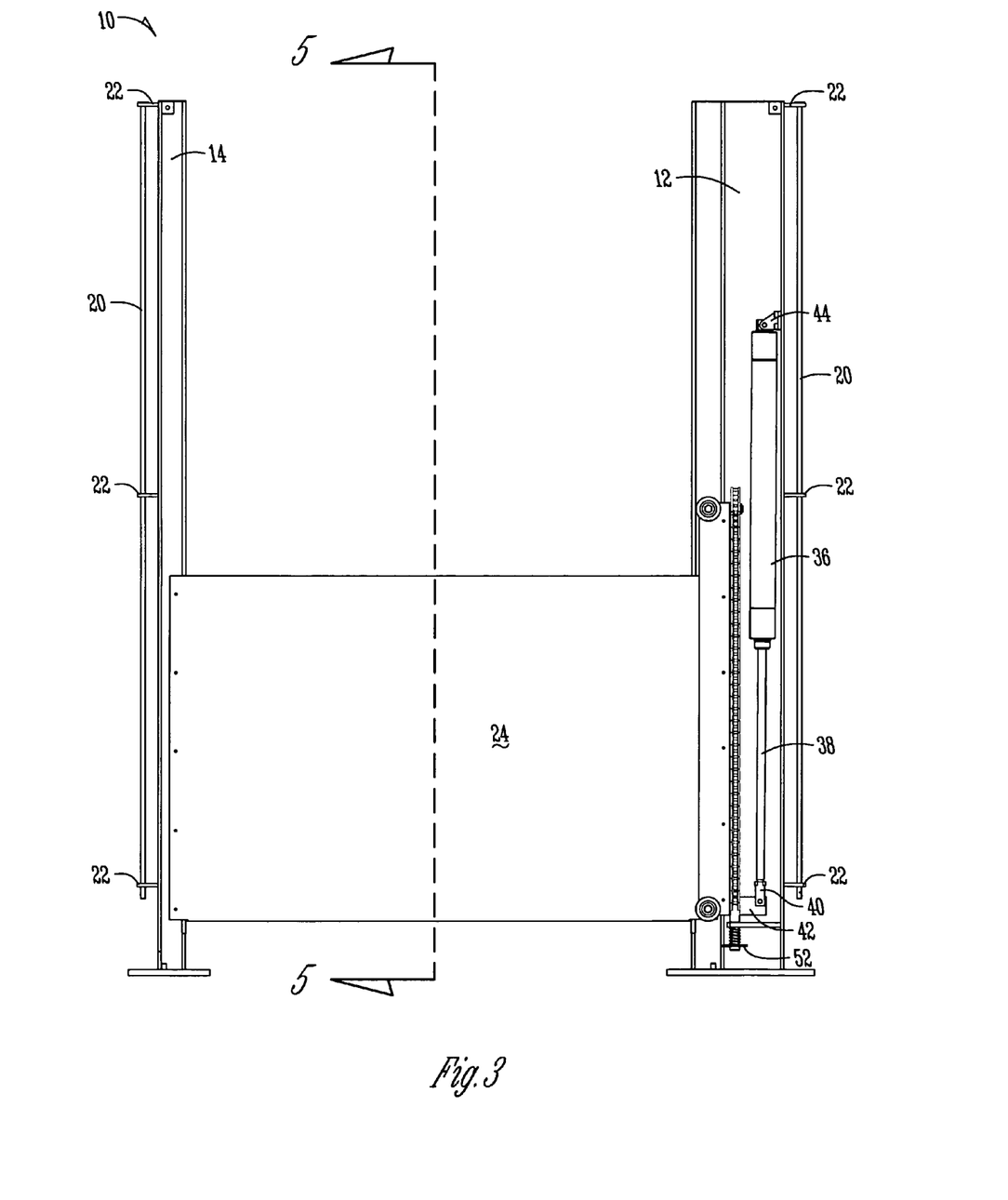
FIG. 3 is a front elevation view of the barrier with the panels in a lowered open position, and with the front covers of the posts removed to show the mechanism for moving the panels.
Figure 4:
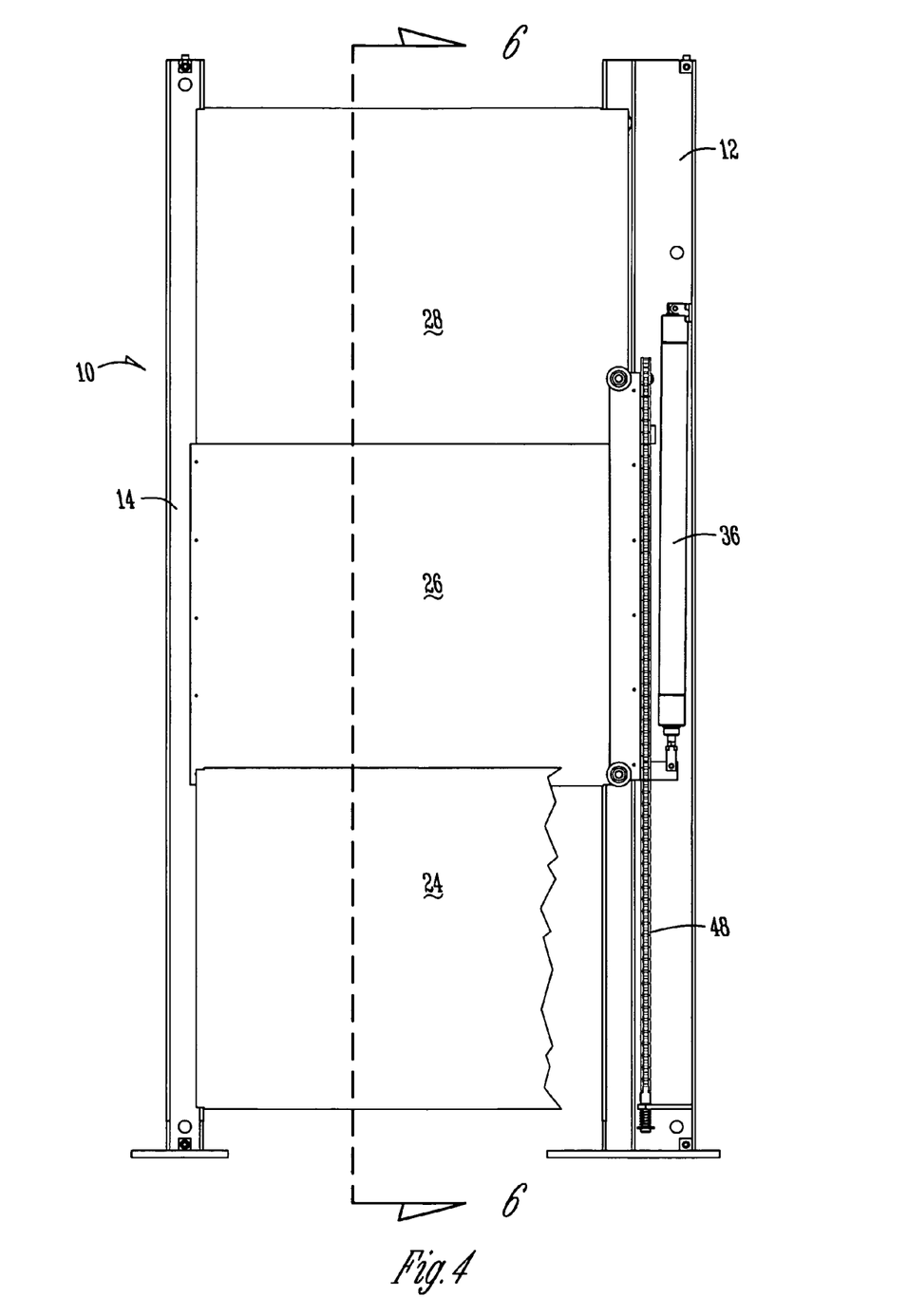
FIG. 4 is a front elevation view of the barrier with the panels in the raised closed position, and with the front covers of the posts removed to show the mechanism for moving the panels.
Figure 14:
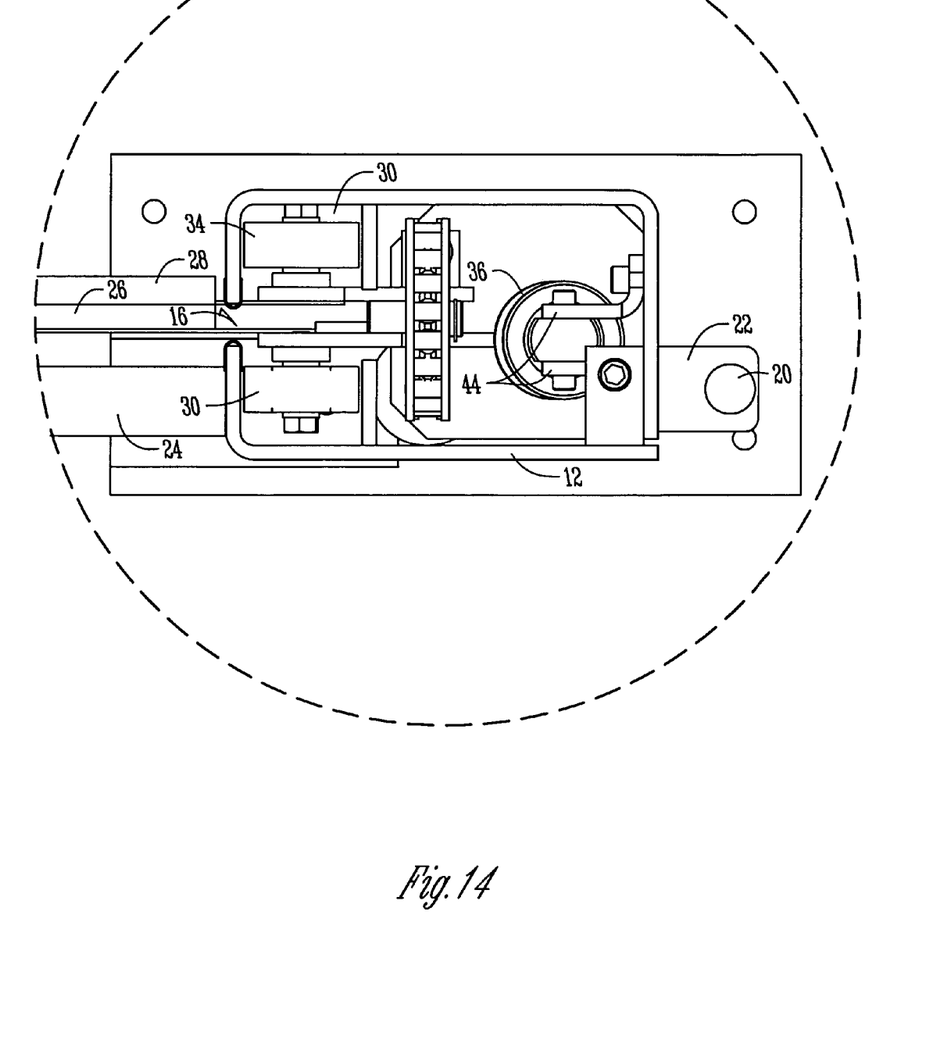
FIG. 14 is an enlarged view taken along lines 14-14 of FIG. 13.
Figure 15:
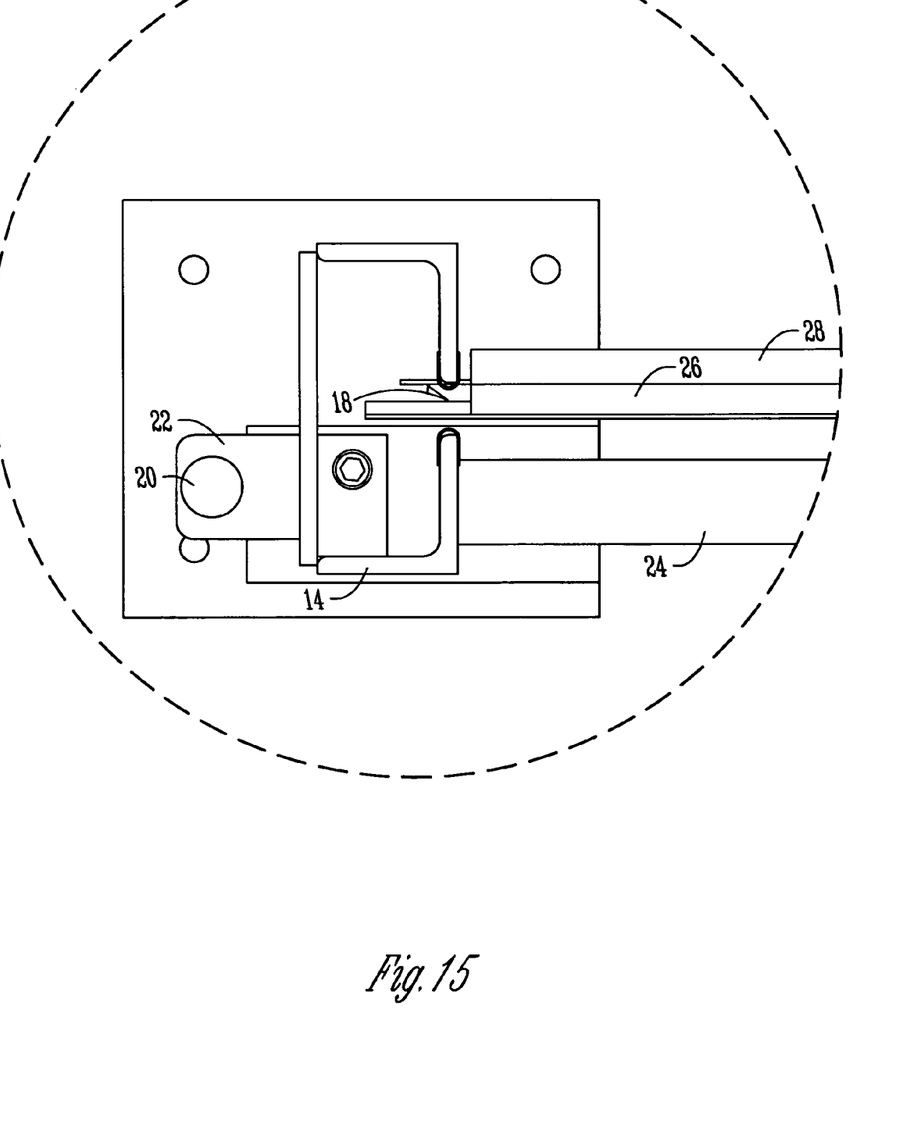
FIG. 15 is an enlarged view taken along lines 15-15 of FIG. 13.

As best seen in FIGS. 3 and 4, the barrier 10 includes a cylinder 36 mounted within the hollow post 12. Preferably, the cylinder 36 is pneumatic, but it is understood that the cylinder 36 may also be hydraulic. The cylinder 36 includes an extensible arm 38 having an end 40 connected to a tab 42 extending from the side of the panel 26 adjacent the lower corner. The upper end of the cylinder 36 is secured to a pair ears 44 in the post 12 as seen in FIG. 14. Cylinder 36 is operatively connected to a source of air or hydraulic fluid (not shown), so as to raise the panel 26 when air is supplied to the cylinder 36, and lower the panel 26 when air is released from the cylinder 36.

Figure 5:
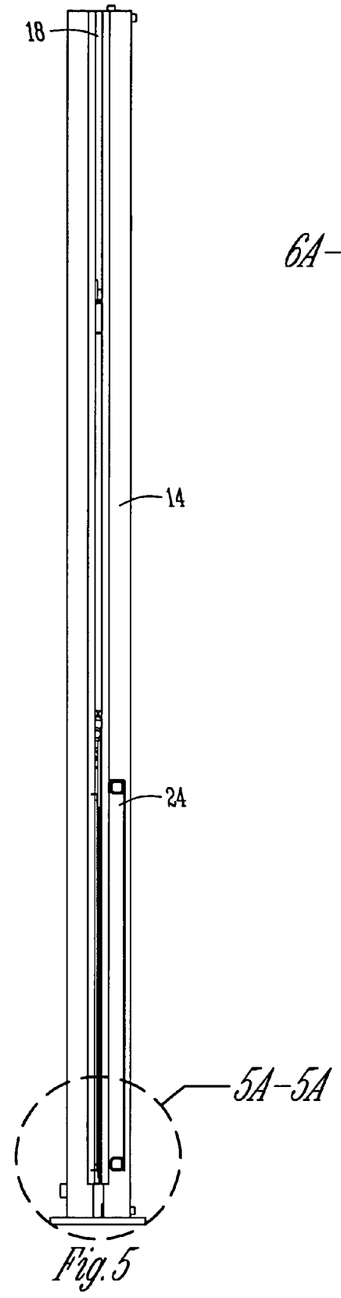
FIG. 5 is a sectional view taken along lines 5-5 of FIG. 3.
Figure 5A:
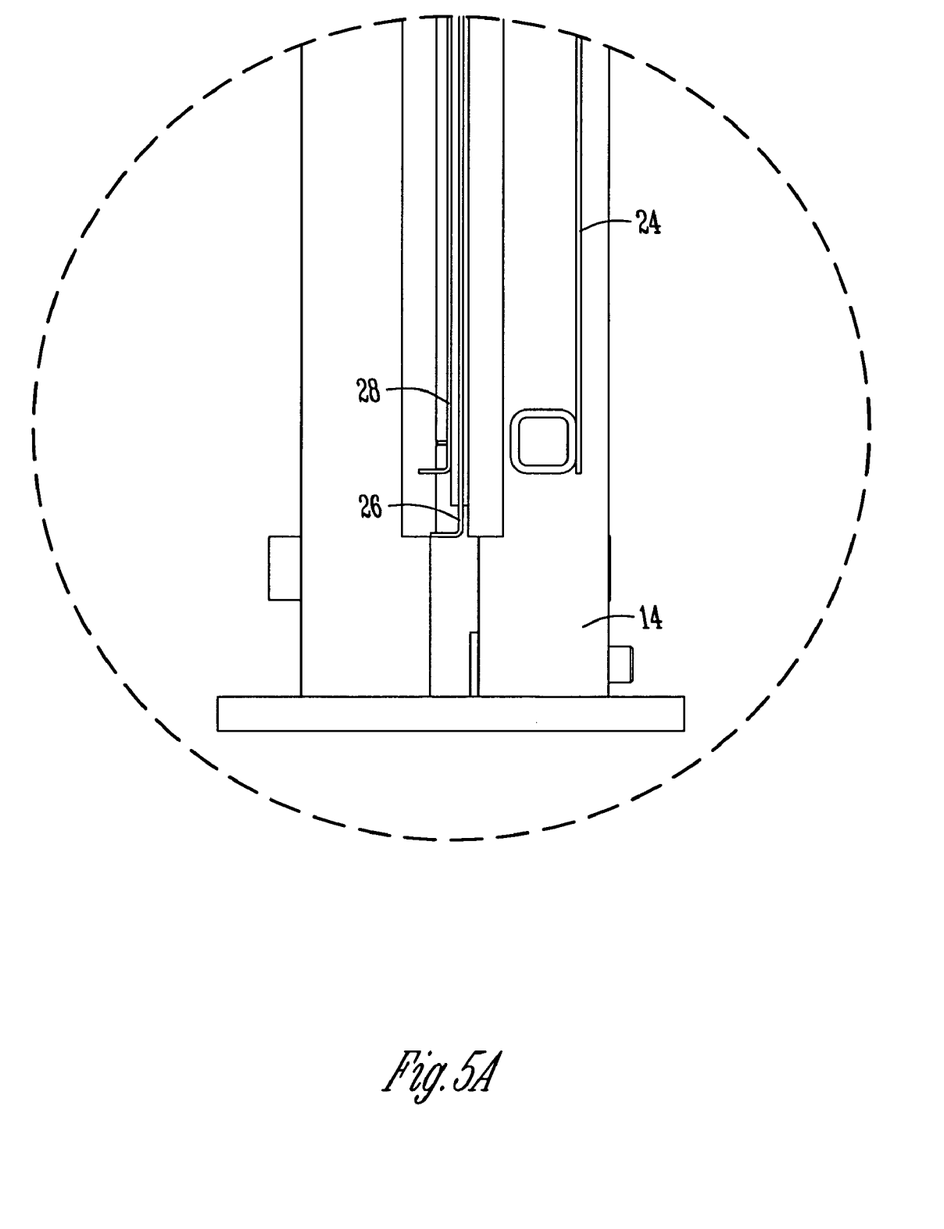
FIG. 5A is an enlarged view taken along lines 5A-5A of FIG. 5.
Figure 6:
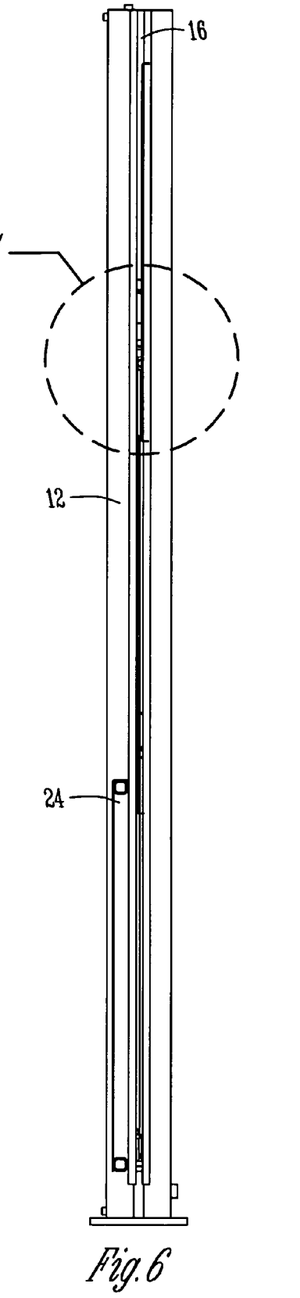
FIG. 6 is a sectional view taken along lines 6-6 of FIG. 4.
Figure 6A:
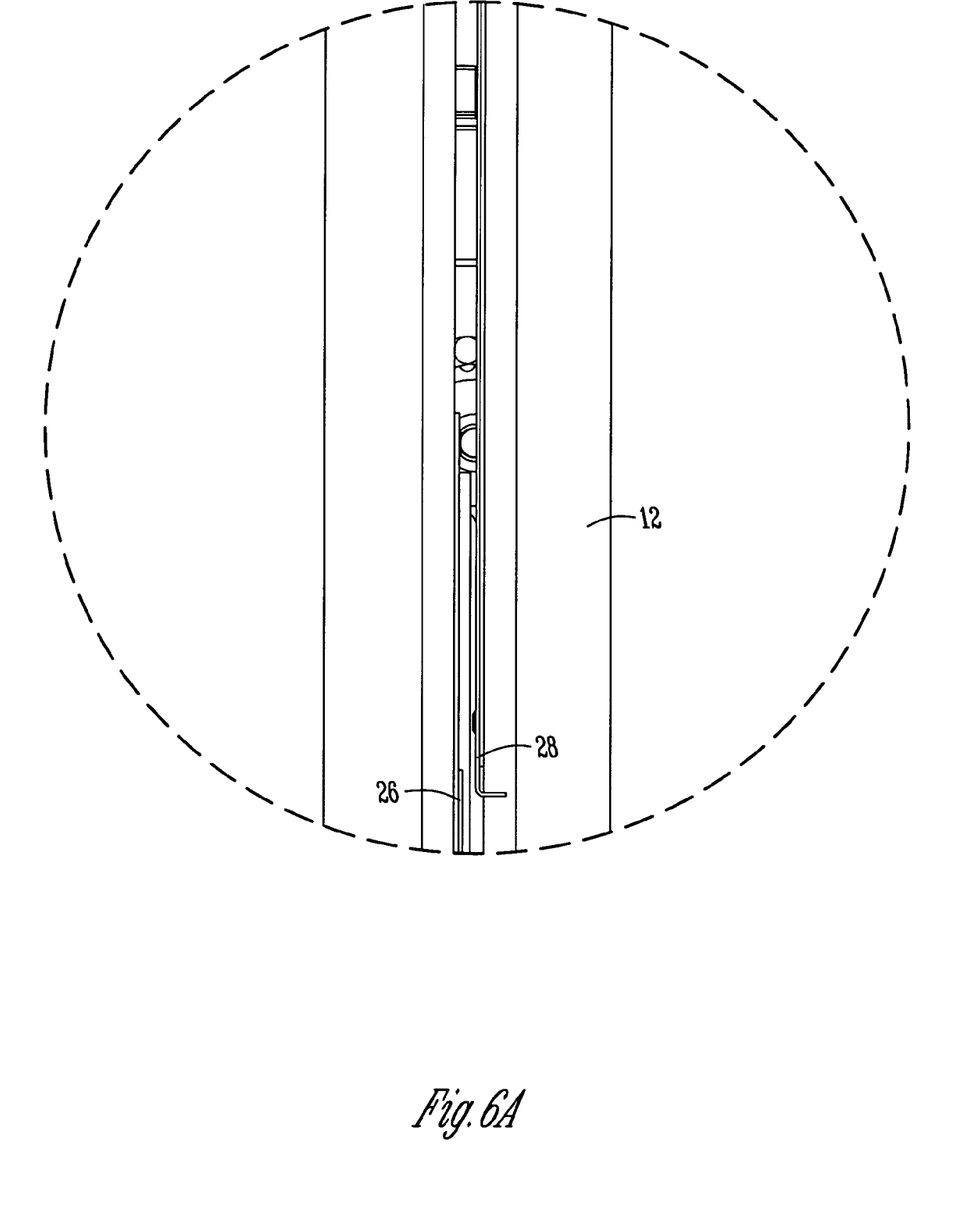
FIG. 6A is an enlarged view taken along lines 6A-6A of FIG. 6.

The upper panel 28 is moved by a pulley system formed by a chain and sprocket assembly. More particularly, a sprocket 46 is rotatably mounted at the upper corner of the middle panel 26. A chain 48 is trained about the sprocket 46. One end of the chain 48 is attached to the tab 42 at the lower corner of the upper panel 28, while the opposite end of the chain 48 is secured to a bolt 52 mounted at the base of the post 12, as best seen in FIGS. 3 and 9. Thus, when the cylinder 36 is actuated to raise or lower the middle panel 26, the upper panel 28 is simultaneously raised or lowered by the chain and sprocket assembly. The upper panel 28 travels a distance twice that of the middle panel 26, due to the mechanical advantage of the chain and sprocket assembly functioning as a pulley system. Thus, the upper panel 28 has a travel ratio of 2:1 with respect to the middle panel 26, such that the upper panel 28 moves to the top of the posts 12, 14 while the middle panel 26 moves to the middle of the posts 12, 14 when the cylinder arm 38 is retracted by supplying air to the cylinder 36. When it is desired to lower the panels 26, 28, air is released from the cylinder 36, such that the panels 26, 28 fall by gravity to the lower opened position, as the cylinder arm 38 is extended. In the lower open position, the panels 24, 26, 28 are stacked one behind another, as shown in FIG. 5A. Thus, the panels 24, 26, 28 occupy a narrow, compact area so as to minimize the footprint of the barrier 10. The panels 24, 26, 28 also have a low profile in the lowered position, preferable no more than 28 inches above the floor, thereby providing better access to the work station.

Preferably, the bolt 52 is spring mounted with a spring 54, as seen in FIG. 3. A sensor (not shown) is provided on the spring 54 so as to activate a logic system to prevent the panels 26, 28 from being raised if the panels encounter an obstacle. For example, if an person is leaning over the panels into the work area and the cylinder 36 is accidentally actuated so as to initiate raising of the panels 26, 28, the sensor on the spring 54 will send a signal to deactivate the cylinder 36, such that the panels 26, 28 fall back to the open lower position.

A proximity or limit switch (not shown) is also preferably provided at the upper end of the post 12, to sense when the panels 26, 28 are fully raised. Preferably, dual switches may be provided for double redundancy, as a safety feature, in accordance with government regulations.

The invention has been shown and described above with the preferred embodiments, and it is understood that many modifications, substitutions, and additions may be made which are within the intended spirit and scope of the invention. From the foregoing, it can be seen that the present invention accomplishes at least all of its stated objectives.

What is claimed is:

1. A barrier for a work station, comprising:
   first and second upright posts having upper ends and an open space between the upper ends through which an object may pass;
   first and second rigid panels extending between the posts and being movable between a lowered open position providing access between the posts to the work station and a raised closed position blocking access to the work station, the panels having opposite ends;
   a cylinder adjacent the first post and having an extendible and retractable arm connected to the first panel for moving the first panel between its lowered and raised positions;
   the second panel being connected to the first panel for movement between its raised and lowered positions upon actuation of the cylinder arm;
   the distance moved by the second panel between its lowered and raised positions being greater than the length of extension and retraction of the cylinder arm; and
   a pulley system extending adjacent the first post and operatively connected to only one end of the first and second panels and to the arm of the cylinder to raise and lower the second panel when the arm is retracted and extended.

2. The barrier of claim 1 wherein the panels move simultaneously between the raised and lowered positions.

3. The barrier of claim 1 wherein the pulley system includes a sprocket on the first panel and a chain trained about the sprocket with opposite ends attached to the second panel and to the cylinder arm.

4. The barrier of claim 1 wherein the posts includes tracks for guiding movement of the panels.

5. The barrier of claim 1 wherein the panels are cantilevered from one of the posts.

6. The barrier of claim 1 wherein the panels include rollers for movement between the raised and lowered positions.

7. The barrier of claim 1 wherein the panels are positioned one behind another in the lowered position and one substantially above the other in the raised position.

8. A work station barrier, comprising:
   a first panel having opposite sides;
   a second panel having opposite sides;
   first and second tracks on the opposite sides of the panels;
   a cylinder mounted on the first track and connected to the first panel and having an extendable and retractable arm to move the first panel between a closed raised position when the arm is retracted and an open lowered position when the arm is extended;
   the second panel moving simultaneously with the first panel between raised and lowered positions; and
   the second panel moving a greater distance than the first panel moves.

9. The work station barrier of claim 8 further comprising a pulley assembly connected to the panels to move the second panel with the first panel.

10. The work station barrier of claim 9 wherein the pulley assembly moves to the second panel in a 2:1 ratio relative to the first panel.

11. The work station barrier of claim 8 wherein the panels are cantilevered from one of the tracks.

12. The work station barrier of claim 8 wherein the panels include rollers on at least one side for movement along the tracks.

13. The work station barrier of claim 8 wherein the panels are positioned one behind another in the lowered position and one substantially above the other in the raised position.

14. A method of barricading a work station, comprising:
 positioning a barrier having an open upper end adjacent the work station, the barrier including a pair of posts with first and second rigid panels extending between the posts, and the panels being movable between a raised closed position and a lowered open position;
 activating a cylinder connected to one end of the first panel to extend and retract an arm on the cylinder and thereby move the first panel between the lowered position and the raised position,
 simultaneously moving the second panel with the first panel between the lowered and raised positions through use of a pulley system adjacent the cylinder and operatively connected only to one end of the panels and to the cylinder arm; and
 the second panel being moved farther than the first panel in the same time period.

15. The method of claim 14 further comprising stacking the panels one behind the other in the lowered position.

16. The method of claim 14 further comprising moving the second panel at a 2:1 ratio relative to the first panel.

17. The barrier of claim 3 wherein the chain and sprocket moves the second panel at a 2:1 ratio relative to movement of the first panel.

18. The barrier of claim 9 wherein the pulley assembly includes a sprocket on the first panel and a chain trained about the sprocket with opposite ends attached to the second panel and to the cylinder arm.

19. The method of claim 14 wherein retracting of the cylinder arm raises the panels to a closed position and extending of the cylinder arm lowers the panels to the open position.

20. The work station barrier of claim 9 wherein the pulley assembly has a single pulley and a single chain located only on one side of the panels.

\* \* \* \* \*